United States Patent
Hansen (10) Patent No.: US 10,433,117 B2
(45) Date of Patent: *Oct. 1, 2019

(54) TIME AND LOCATION-BASED OBJECT TRACKING AND PRESENCE CONFIRMATION

(71) Applicant: Brilliant Points, Inc., Reno, NV (US)

(72) Inventor: Christopher G. Hansen, Lehi, UT (US)

(73) Assignee: Brilliant Points, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,238

(22) Filed: Jan. 18, 2019

(65) Prior Publication Data

US 2019/0156064 A1    May 23, 2019

Related U.S. Application Data (63) Continuation-in-part of application No. 16/042,426, filed on Jul. 23, 2018, now Pat. No. 10,187,754.

(60) Provisional application No. 62/535,914, filed on Jul. 23, 2017.

(51) Int. Cl.
| | |
|---|---|
| H04L 9/06 | (2006.01) |
| H04W 4/02 | (2018.01) |
| G06F 21/32 | (2013.01) |
| H04L 29/08 | (2006.01) |
| H04W 4/029 | (2018.01) |

(52) U.S. Cl.
CPC .......... *H04W 4/029* (2018.02); *G06F 21/32* (2013.01); *H04L 67/22* (2013.01); *H04W 4/023* (2013.01); *H04L 9/0637* (2013.01)

(58) Field of Classification Search
CPC . H04L 9/3247; H04L 2209/80; H04L 9/3297; H04L 63/0861; H04L 63/107; H04L 9/3236; H04W 4/029; H04W 4/023; G01S 5/0027; G01S 19/42; G06F 21/32
See application file for complete search history.

(56) References Cited

U.S. PATENT DOCUMENTS

| | | | |
|---|---|---|---|
| 2004/0044911 | A1 | 3/2004 | Takada |
| 2007/0118739 | A1 | 5/2007 | Togashi |
| 2011/0109508 | A1 | 5/2011 | Wolman |
| 2016/0234207 | A1 | 8/2016 | Bauchspies |

(Continued)

OTHER PUBLICATIONS

Website Alibi "www.discoveralibi.com" accessed on Oct. 22, 2018. 2 pgs.

*Primary Examiner* — Nizar N Sivji
(74) *Attorney, Agent, or Firm* — Maschoff Brennan; Paul G. Johnson (57) ABSTRACT

A method may include obtaining from a sensor coupled to an object, a first indicator of a first location of the object at a first time period; obtaining a second indicator of the first location of the object at the first time period; confirming the first location of the object at the first time period by comparing the first and second indicators to create a first record; storing the first record; obtaining, a third indicator of a second location of the object at a second time period; storing a second record comprising the third indicator of the second location; linking the first and second records to create an unalterable third record of a route of the object, the route of the object including at least the first and second locations; encrypting the unalterable third record; and sending the encrypted unalterable third record to a third party.

20 Claims, 4 Drawing Sheets

(56) References Cited

U.S. PATENT DOCUMENTS

2017/0041148 A1 2/2017 Pearce
2018/0049028 A1 2/2018 Tali

TIME AND LOCATION-BASED OBJECT TRACKING AND PRESENCE CONFIRMATION

CROSS-REFERENCE TO RELATED APPLICATION

This application is a continuation-in-part application of U.S. patent application Ser. No. 16/042,426 filed Jul. 23, 2018 (now U.S. Pat. No. 10,187,784, issued Jan. 22, 2019) and titled "Time and Location-Based User Tracking and Presence Confirmation," which claims the benefit of and priority to U.S. Provisional Application No. 62/535,914, filed Jul. 23, 2017, and titled "Location Verification System," both of which are incorporated herein by reference in their entireties.

FIELD

The embodiments discussed in the present disclosure are related to obtaining data regarding the presence of a user, an object, and/or a computing device associated with a user or an object in a location at a time (or multiple locations over one or more time frames).

BACKGROUND

A user may desire an accurate and irrefutable accounting of his or her whereabouts at specific times. In some examples, the accounting may be used to provide an alibi in a court case. In other examples, the accounting could be used to prove a user's whereabouts for litigation purposes, employment purposes, custody purposes, tax purposes, and/or other purposes. There may be other reasons that a user might benefit from having an accurate and provable report of his or her locations over time. In an additional or alternative embodiment, an administrator (e.g., an individual, an owner, a buyer, a shipper, a company) may desire an accurate and irrefutable accounting of the whereabouts of an object, such as a package or a shipment, as the object moves from point A to point B. In an additional or alternative embodiment, the administrator may desire an accurate and irrefutable accounting of the handling of the object as the object moves from point A to point B.

The subject matter claimed in the present disclosure is not limited to embodiments that solve a particular disadvantage or that operate only in environments such as those described above; rather, this background is only provided to illustrate one example technology area where some embodiments described in the present disclosure may be practiced.

SUMMARY

In an example embodiment, a method may include obtaining from a sensor coupled to a first object, by a processor, a first indicator of a first location of the first object at a first time period; obtaining a second indicator of the first location of the first object at the first time period; confirming the first location of the first object at the first time period by comparing the first indicator and the second indicator to create a first record; storing the first record on a storage device; obtaining, by the processor, a third indicator of a second location of the first object at a second time period; storing a second record on the storage device, the second record comprising the third indicator of the second location; linking the first record and the second record to create an unalterable third record of a route of the first object, the route of the first object including at least the first location and the second location; encrypting the unalterable third record; and sending the encrypted unalterable third record to a third party.

In some embodiments, the method may include obtaining, by the processor, data related to physical manipulation of the first object.

In some embodiments, obtaining data related to physical manipulation of the first object may further include receiving an indicator of manipulation from the sensor coupled to the first object, the indicator of manipulation at least one of a change in temperature, moisture level, pressure, force, velocity, mass, route, tilt, vibration, rotation, or a combination thereof.

In some embodiments, obtaining the second indicator of the first location may further include obtaining data from a second sensor coupled to a second object, the second object located within a predetermined distance of the first object, and wherein the sensor coupled to the first object is in communication with the second sensor.

In some embodiments, obtaining data from the second sensor may further include obtaining data from the second sensor affixed to a static location along the route of the first object.

In some embodiments, obtaining the first, second, and third indicator may further include obtaining at least one of photographic data, video data, sound data, text data, wireless data, alphanumeric data, physical manipulation data, or a combination thereof.

In some embodiments, obtaining the second indicator may further include obtaining the second indicator by a second method different from a first method to obtain the first indicator.

In some embodiments, the method may further include applying a computer learning algorithm to the comparison of the first indicator and the second indicator; determining an accuracy score of the first record based in part on applying the computer learning algorithm; and updating the first record based in part on the accuracy score.

In some embodiments, linking the first record and the second record may further include linking using block chain encryption.

In some embodiments, obtaining the first indicator of the first location may further include obtaining, by the processor, the first indicator automatically obtained without input from a human.

In some embodiments, the method may further include determining an attempt to falsify the first record; and transmitting an alert to the third party based on determining the attempt to falsify the first record.

In some embodiments, the method may further include storing the first record in memory associated with the processor.

In some embodiments, the method may further include sending the encrypted first record to a third party storage device.

In some embodiments, obtaining, from the sensor coupled to the first object, the first indicator of the first location further includes obtaining data from a tracking device coupled to the first object, wherein the tracking device communicates with a second computer device by way of mesh networking communications.

In some embodiments, the method described above may be performed by a system, where the system includes a processor, memory in electronic communication with the processor, and instructions stored in the memory, the instructions being executable by the processor to cause the system to perform the operations described above and herein. In some embodiments, one or more non-transitory computer-readable media comprising one or more computer-readable instructions, that when executed by one or more processors of a computing device may cause the computing device to perform the method described above and herein.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which.

DESCRIPTION OF EMBODIMENTS

Some embodiments described in the present disclosure relate to methods and systems of time and location-based object tracking and presence confirmation over a period of time and/or over multiple periods of time.

In at least one example, obtaining and preparing an accurate and reliable accounting of a user's whereabouts may be used to verify that the user is where he or she says he or she is, or was, at a specific time. Such an accounting may be useful to provide an alibi if the user is accused of a crime or may be useful in other circumstances and/or for other purposes. In terms of an alibi, the knowledge that the systems and methods described herein may be used to construct an accurate and secure accounting of a user's locations may encourage users to participate in data collection and/or sharing. The increased participation in data sharing and collection may improve the system's abilities to construct the accounting, as well as continue to verify and secure the data provided by one or more users.

In an additional or alternative embodiment, it may be desirable to similarly track the location and movement of an object, such as a vehicle, a shipment, a product, a package, or any other object. For example, a product being shipped from one location (e.g., store, city, country) to another (e.g., a house, another city, another country) may be monitored to determine the path an object took over a certain period of time, whether the product has been mishandled, and/or whether the product has been swapped with an unexpected product. Other example embodiments are contemplated.

Thus, a check-in system which enables objects to be tracked based on data obtained about the location of the object, as well as data collected about the location of other objects, as well as data regarding the handling of objects, is provided.

Embodiments of the present disclosure are explained with reference to the accompanying drawings.

Figure 1:
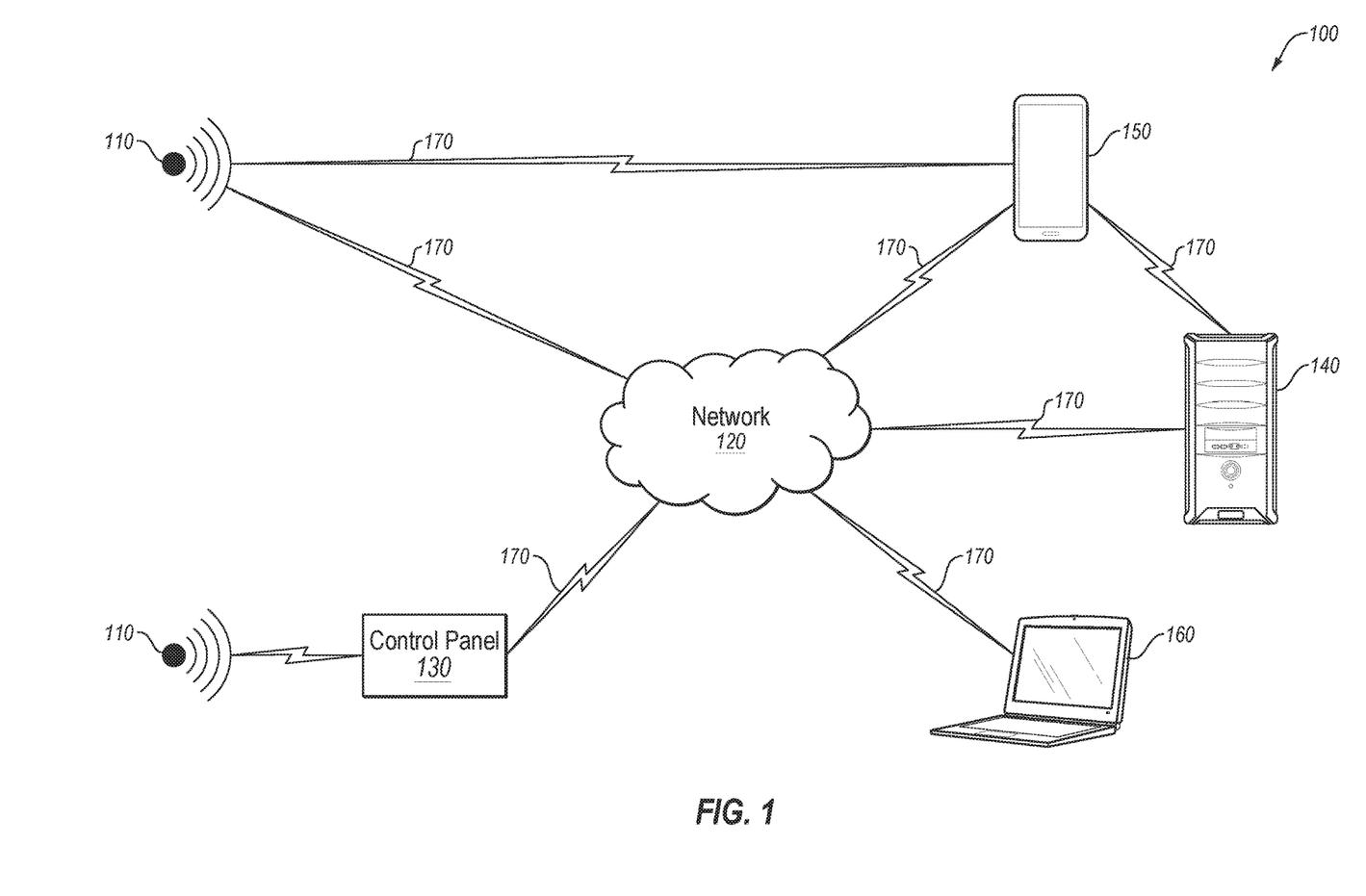
FIG. 1 illustrates an example communications system related to time and location-based object tracking and presence confirmation in accordance with at least one embodiment.

FIG. 1 illustrates an example communications system 100 related to time and location-based object tracking and presence confirmation in accordance with at least one embodiment described in the present disclosure. The communications system 100 may include one or more sensor units 110, a network 120, a control panel 130, a server 140, a remote computing device 160, and/or a local computing device 150. The remote computing device 160 and the local computing device 150 may each be referred to generically as computing device 150 or 160 and/or together as computing devices 150, 160. The network 120 may communicate by way of wired or wireless communication links 170 with the sensor units 110, the local computing device 150, the remote computing device 160, and the server 140. The control panel 130 may interface with the network 120 through wired and/or wireless communication links 170 to communicate with one or more remote servers (e.g., the server 140). The control panel 130 may perform communication configuration, adjustment, and/or scheduling for communication with the computing devices 150 and 160, or may operate under the control of a controller. The control panel 130 may communicate with a back end server (e.g., the server 140)—directly and/or indirectly—using at least one of the communication links 170.

The control panel 130 may wirelessly communicate with the computing devices 150, 160 by way of one or more antennas. The control panel 130 may provide communication coverage for a respective geographic coverage area (not specifically illustrated in FIG. 1). In some examples, the control panel 130 may be referred to as and/or may include a control device, a base transceiver station, a radio base station, an access point, a radio transceiver, or some other suitable terminology or device. The geographic coverage area for the control panel 130 may be divided into sectors making up only a portion of the full coverage area. The communications system 100 may include control panels of different types. There may be overlapping geographic coverage areas for one or more different parameters, including different technologies, features, subscriber and/or user preferences, laws, regulations, hardware, software, technology, and/or methods. For example, each control panel may be related to one or more discrete structures (e.g., a home, a business, a ship, a truck, a van, a train, an airplane, etc.) and each of the one or more discrete structures may be related to one or more discrete areas (e.g., a neighborhood, a city, a state, a country, a route, etc.). In other examples, multiple control panels may be related to one or more discrete structures (e.g., multiple control panels may be associated with a single home and/or business complex) and/or may be related to one or more entities (e.g., a business, a partnership between different entities in a supply chain, etc.).

The computing devices 150 and 160 may be dispersed throughout the communications system 100 and each of computing device 150 and 160, respectively, may be stationary and/or mobile. The computing devices 150 and 160 may each include a cellular phone, a tablet computer, a wearable electronic device (e.g., a smart watch, a biometric sensor and/or a tracker), a personal digital assistant (PDA), a wireless modem, a handheld device, a laptop computer, a cordless phone, a wireless local loop (WLL) station, a display device (e.g., a television set, a computer monitor, etc.), a printer, a camera, other suitable computing device, or any combination of the above. The computing devices 150 and 160 may also include or be referred to as a user device, a user equipment, a smartphone, a BLUETOOTH® device, a Near-Field Communication (NFC) device, a Wi-Fi device, a mobile station, a subscriber station, a remote unit, a handset, a user agent, a mobile client, a client, and/or some other suitable device and/or terminology.

The geographic coverage area for the control panel 130 may be divided into sectors making up only a portion of the coverage area. The communications system 100, therefore, may include more than one control panel 130, where each control panel 130 may provide geographic coverage for a sector of the coverage area.

The communications system 100 may include one or more control panels 130 of different types; for example, the control panel 130 may be a local computing device and/or a computing interface located at a home, a business, and/or a transportation vessel. The control panel 130 may be in direct communication by way of wired or wireless communication links with the one or more sensor units 110. Alternatively or additionally, the control panel 130 may receive sensor data from the one or more sensor units 110, e.g., by way of the computing devices 150, 160, the server 140, and/or the network 120.

In at least one embodiment, the control panel 130 may include, or otherwise be coupled to/in communication with, a speaker, a microphone, and/or a camera. The control panel 130 may operate to broadcast audio and/or video communications from computing devices 150 and/or 160. Alternatively or additionally, the control panel 130 may receive input in the form of audio input, video input, biometric data, geographic data (e.g., geotagging, global positioning data), regulatory data, or other data.

The control panel 130 may wirelessly communicate with the sensor units 110 via one or more antennas. The sensor units 110 may be dispersed throughout the communications system 100 and each of the sensor units 110 may be stationary and/or mobile. Each of the sensor units 110 may include and/or may be one or more sensors that sense: proximity, motion, temperatures, humidity, vibration, sound level, smoke, structural features (e.g., glass breaking, window position, door position), time, amount of light, geo-location data of a user, geo-location data of a device, and/or geo-location data of an object or multiple objects, distance, biometrics, weight, speed, height, size, gait, preferences, weather, system performance, respiration, heartbeat, and/or other inputs that relate to time-based verification of determining the presence of an object at a specific location.

The computing devices 150 and/or 160 and/or at least one of the sensor units 110 may be able to communicate through one or more wired and/or wireless connections with various components such as control panels, antennas, base stations, and/or network equipment (e.g., servers, wireless communication points, etc.).

The communication links 170 illustrated in communications system 100 may include uplink (UL) transmissions from computing devices 150 and 160 and/or the sensor units 110 to control panel 130, and/or downlink (DL) transmissions, from control panel 130 to computing devices 150 and/or 160. The downlink transmissions may also be called forward link transmissions while the uplink transmissions may also be called reverse link transmissions. Each communication link 170 may include one or more carriers, where each carrier may be or include a signal made up of multiple sub-carriers (e.g., waveform signals of different frequencies) modulated according to the various radio technologies. Each modulated signal may be sent on a different sub-carrier and may carry control information (e.g., reference signals, control channels, etc.), overhead information, user data, etc. The communication links 170 may transmit bidirectional communications and/or unidirectional communications, including 345 MHz, Wi-Fi, BLUETOOTH®, BLUETOOTH® Low Energy, cellular, Z-WAVE®, millimeter wave, 802.11, peer-to-peer (P2P), ZigBee, LAN, WLAN, Ethernet, FireWire, fiber optic, and/or other connection types.

In some embodiments, the control panel 130 and/or the computing devices 150 and/or 160 may include one or more antennas configured to employ antenna diversity schemes to improve communication quality and reliability between the control panel and the computing devices. Additionally or alternatively, the control panel 130 and/or the computing devices 150 and 160 may employ multiple-input, multiple-output (MIMO) techniques that may take advantage of multi-path, mesh-type environments to transmit multiple spatial layers carrying the same or different coded data.

While the computing devices 150 and/or 160 may communicate with each other through the control panel 130 using communication links 170, each of the computing devices 150 and/or 160 may communicate with one or more other devices by way of one or more direct communication links 170. Two or more of the computing devices 150 and 160 may communicate via a direct communication link 170 when both of the computing devices 150 and 160 are in the geographic coverage area or when one or neither of the computing devices 150 or 160 is within the geographic coverage area. Examples of direct communication links 170 may include Wi-Fi Direct, BLUETOOTH®, wired, and/or other P2P group connections. The computing devices 150 and 160 in these examples may communicate according to the Wide Local Area Network (WLAN) radio and baseband protocol including physical and Media Access Control (MAC) layers from the Institute of Electrical and Electronics Engineers (IEEE) standards, such as 802.11, and its various versions including: 801.11a, 802.11b, 802.11g, 802.11n, 802.11ac, 802.11ad, and 802.11ah. In other implementations, other P2P connections and/or ad hoc networks may be implemented within communications system 100.

In some examples, the local computing device 150 may be or include a custom computing entity configured to interact with the sensor units 110 via the network 120 and/or the server 140. In other examples, the local computing device 150 may be or include a general purpose computing entity such as a personal computing device; for example, the local computing device 150 may be or include a desktop computer, a laptop computer, a netbook, a tablet personal computer (PC), a control panel, an indicator panel, a multi-site dashboard, an IPOD® or other electronic media player, a smartphone, a cellular phone, a PDA, and/or any other suitable device operable to send and receive signals, store and retrieve data, and/or execute software components. In an alternative or additional embodiment, local computing device 150 may be or include a general purpose computing entity such as a computing device owned by or controlled by a business entity.

The computing devices 150 and 160 may each include memory, a processor, an output, a data input, and a communications component. The processor may be or include a general purpose processor, a Field Programmable Gate Array (FPGA), an Application Specific Integrated Circuit (ASIC), a Digital Signal Processor (DSP), or other suitable processor device. The processor may be configured to retrieve data from and/or write data to the memory.

The memory may be or include a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, or other suitable memory device or system. In some embodiments, the computing devices 150 and 160 may include one or more hardware-based modules (e.g., FPGA, ASIC, DSP, etc.) and/or software-based modules (e.g., a module of computer code stored at the memory and executed at the processor, a set of processor-readable instructions that may be stored at the memory and executed at the processor) associated with executing an application, such as, for example, receiving, analyzing, transmitting, and/or displaying data from the sensor units 110.

The processor of the local computing device 150 may be operable to control operation of the output of the local computing device 150. The output may be or include a television, a liquid crystal display (LCD) monitor, a cathode ray tube (CRT) monitor, a plasma monitor, a speaker, tactile output devices (e.g., a capacitive touchscreen device), a smart speaker, hearable devices, holograms, or other suitable output device or component. In some embodiments, the output may be an integral component of the local computing device 150; for example, the output may be directly coupled to the processor. In some embodiments, an output component may include a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing device 150 to the output.

The remote computing device 160 may be or include a computing entity operable to enable a remote user to monitor the output of the sensor units 110 and/or the local computing device 150. The remote computing device 160 may be functionally and/or structurally similar to the local computing device 150 and may be operable to receive data streams from and/or send signals to at least one of the sensor units 110 via the network 120. The network 120 may be or include the Internet, an intranet, a personal area network (PAN), a local area network (LAN), a wide area network (WAN), a virtual network, a telecommunications network implemented as a wired network and/or wireless network, or other suitable network. The remote computing device 160 may receive and/or send signals over the network 120 by way of communication links 170 and/or the server 140.

In some embodiments, one or more of the sensor units 110 may communicate through wired and/or wireless communication links 170 with one or more of the computing devices 150 and 160, the control panel 130, and/or the network 120. The network 120 may communicate through wired and/or wireless communication links 170 with the control panel 130 and the computing devices 150 and 160 through the server 140. Alternatively or additionally, the network 120 may be integrated with any of the computing devices 150 and 160 and/or the server 140 such that separate components are not required. Additionally, in another embodiment, one or more of the sensor units 110 may be integrated with the control panel 130, and/or the control panel 130 may be integrated with the location computing device 150 such that separate components may not be needed.

In some embodiments, the one or more sensor units 110 may be or include sensors configured to conduct periodic or ongoing automatic measurements related to determining the location and handling of an object (and/or multiple objects) during a specific time or times. In an additional or alternative embodiment, the location and handling of the object during a specific time or times may be determined with reference to the location and handling of nearby and/or related objects.

Each of the sensor units 110 may be enabled to sense multiple identifications, location-determining, and/or time-determining parameters, or alternatively, separate sensor units 110 may monitor separate identification and/or location determining parameters. For example, each of the sensor units 110 may be coupled to or associated with an object, such as a package, where one sensor unit 110 may determine the identity of the object, whereas a second sensor 110 may receive data related to determining the location of the object, independently and/or in relation to additional objects. Still further, a third sensor unit 110 may receive data related to other parameters associated with an object at or over a given time frame, such as the orientation of an object, the route an object has traversed, the force exerted on an object, or other suitable parameter(s).

In some embodiments, the local computing device 150 may additionally monitor alternate location-determination parameters, such as detecting a heartbeat, breathing, motion, heat signatures, sound, moisture, pressure, movement, etc. In alternative embodiments, a user or administrator may input identification and/or location information directly at the local computing device 150 or a control panel 130. The identification and/or location data may be communicated to the remote computing device 160 for verification. In some embodiments, the identification and/or location data communicated to the local and/or remote computing devices 150 and 160 may be encrypted. Alternatively or additionally, a GPS chip or other feature integrated with a user or administrator's local computing device 150 may communicate the object's location to the remote computing device 160. Alternatively or additionally, a mesh network-enabled tracking device may be affixed to the object, where the tracking device may obtain data about the object and the location of the object, and communicate the data to other tracking devices affixed to other objects within a proximity of one another. In an alternative or additional embodiment, mesh network-enabled tracking devices may be affixed to structures that are at fixed, e.g., static, locations along an intended route of an object. In an alternative or additional embodiment, tracking devices may be affixed to structures and locations that are not part of the intended route of the object, but may be used to track if the movement of the object is not as is expected, or may be placed to track other objects on different routes. The tracking devices affixed to structures at fixed locations along the route may be used to provide verification of the movement of the object.

In some embodiments, one or more of the sensor units 110 may be separate from the control panel 130 and may be positioned at various locations throughout a property (e.g., a house, an apartment, a room, an office building, outside of a building, and/or in other properties) or on or throughout a means of transportation (e.g., a ship, a boat, a truck, a van, a train, an airplane). Alternatively or additionally, one or more of the sensor units 110 may be dispersed at different locations in a geographic area, such as at different buildings (inside and outside), outside on public streets and walkways and/or parks, and/or in locations in a geographic area. Alternatively or additionally, the one or more sensor units 110 may be integrated or collocated with other building automation system components, home appliances, building fixtures, and/or other structures, devices, or components; for example, one of the sensor units 110 may be integrated into a front door monitoring system, a light fixture, a wall outlet or switch, a home or office automation digital interface, or other structure, device, or component. In any embodiment, any of the sensor units 110, the control panel 130, and/or the computing devices 150, 160 may include a speaker unit, a microphone unit, and/or a camera unit.

The server 140 may be configured to communicate with the one or more sensor units 110, the local computing device 150, the remote computing device 160, and/or the control panel 130. The server 140 may perform additional processing on signals received from the one or more sensor units 110, the local computing device 150, or the control panel 130, and may forward the received information to the remote computing device 160.

The server 140 may be or include a computing device operable to receive data streams, store, and/or process data, and/or transmit data and/or data summaries and analysis. The server 140 may include a database (e.g., in memory) containing location, identification, time, and/or authentication data received from the sensor units 110 and/or the local computing device 150 and/or the control panel 130. Additionally, software (e.g., stored in memory) may be executed on a processor of the server 140.

Modifications, additions, or omissions may be made to FIG. 1 without departing from the scope of the present disclosure. For example, the communications system 100 may include more or fewer elements than those illustrated and described in the present disclosure. In addition, in some embodiments, the sensor units 110, the control panel 130, the local and/or remote computing devices 150 and 160, respectively, and/or the server 140 may be combined such that they may be considered the same device.

Figure 2:
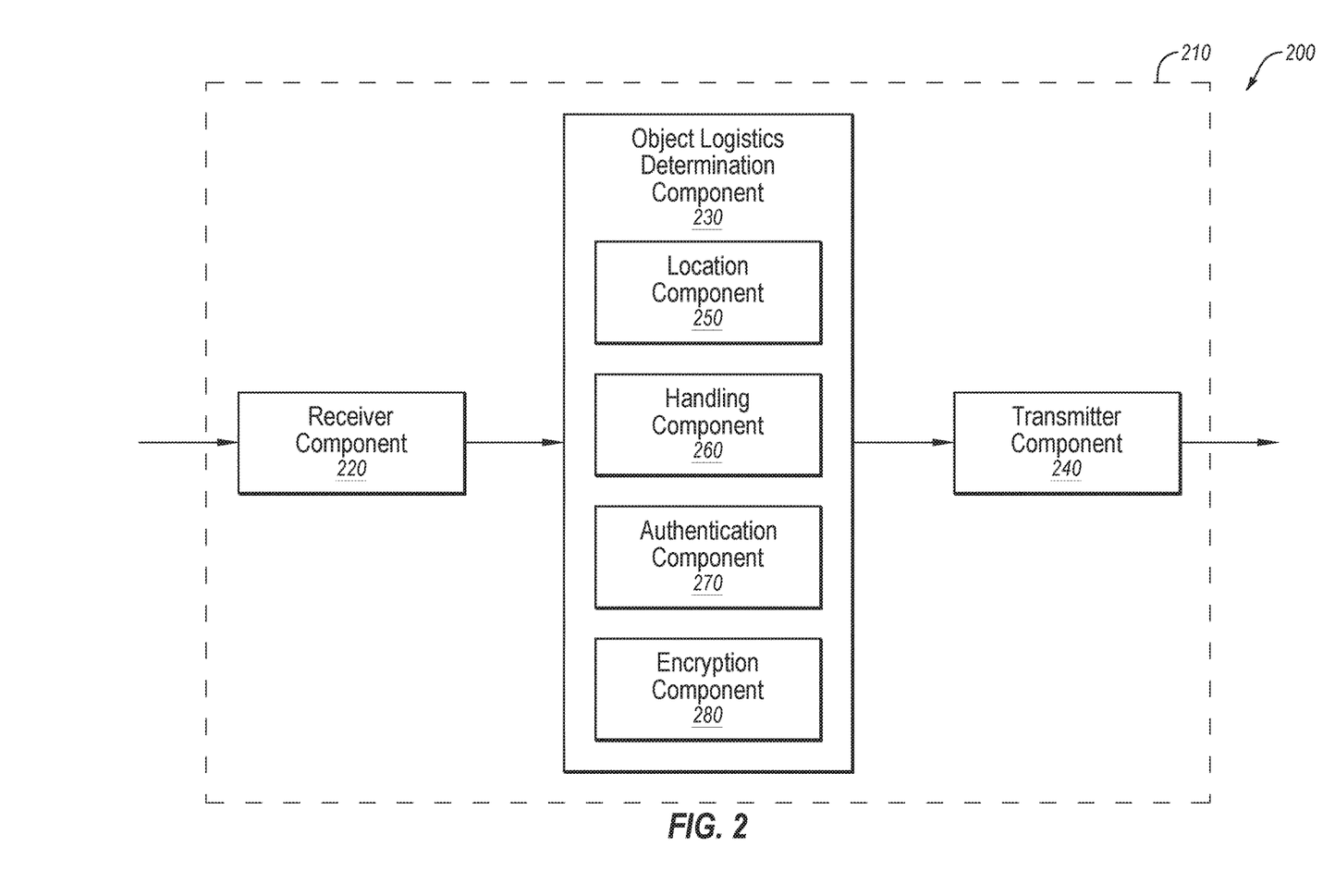
FIG. 2 illustrates a block diagram of an example apparatus related to time and location-based object tracking and presence confirmation in accordance with at least one embodiment.

FIG. 2 illustrates a block diagram 200 of an example apparatus 210 related to time and location-based object tracking and presence confirmation in accordance with at least one embodiment. The apparatus 210 may be an example of one or more aspects, features, or components of the control panel 130, the local computing device 150, the remote computing device 160 and/or one or more of the sensor units 110. The apparatus 210 may include a receiver component 220, an object logistics determination component 230, and/or a transmitter component 240. The apparatus 210 may also be or include a processor. Two or more of the components of the apparatus 210 may be in communication with one another—directly and/or indirectly.

The components of the apparatus 210 may, individually or collectively, be implemented using one or more ASICs adapted to perform some or all of the applicable functions in hardware. Alternatively, the functions may be performed by one or more other processing units or cores, on one or more integrated circuits. In other examples, other types of integrated circuits may be used (e.g., Structure/Platform ASICs, FPGAs, and other custom or Semi-Custom ICs), which may be programmed in any manner known in the art. The functions of each component may also be implemented—in whole or in part—with instructions embodied in memory formatted to be executed by one or more general and/or application-specific processors.

In at least one embodiment, the apparatus 210 may be or include a computing system or sensor located at a location; for example, the apparatus 210 may be or include an interactive wall panel located outside an entrance to a building, or may be or include an interactive wall panel located at any location within a building. In some embodiments, the apparatus 210 may not be interactive, but may rather be or include a passive sensor, such as an RFID scanner, a motion sensor, a security camera, a base station, a hotspot, or other passive sensor. Alternatively or additionally, the apparatus 210 may be or include a hand-held personal computing device in the possession of a user or administrator to be tracked, such as a smart phone, a tablet device, a wearable computing device, or other hand-held personal computing device. The location at which the apparatus 210 may be located may include a residence, curtilage (e.g., inside or outside of a garage, a barn, a shed, a patio, or other structure or area in or on an area of land surrounding a house), a commercial building, a government building, a park, streets, banks, restaurants, plazas, a gymnasium, a school, or other locations.

In an additional or alternative embodiment, apparatus 210 may be or may be associated with a mobile user or object tracking device. In one embodiment, the tracking device may utilize mesh network communications, such as P2P communications, including a ZigBee based network. In one embodiment, the tracking device may be coupled to or integrated within an object, a transportation vessel or vehicle, or at various locations within a geographic area such as buildings, parks, light poles, toll booths, etc.

In at least one embodiment, the apparatus 210 may be or include a biometric sensor such as an eye scanner, a fingerprint scanner, a palm scanner, a voiceprint sensor, a camera calibrated to identify facial structure; a GPS receiver or an input device (e.g., a keypad) into which an administrator may input a personal identification number (PIN); a motion sensor; a vibration sensor; a light sensor, or other biometric sensor. Alternatively or additionally, a user may interact with a software application executing on a smart computing device to "check-in" that he or she is present at a location.

In an additional or alternative embodiment, the "user" may be an object being tracked, both with respect to location, but also with respect to handling. Thus, a tracking device or other communication device coupled to, integrated within, or associated with the object may interact with a software application executing on a computing device or another tracking device to "check-in" that the object is present at a location, is within a pre-determined proximity of other tracked objects, and/or is being handled in a certain manner (e.g., not being dropped from higher than a pre-determined height, not being tipped, not being thrown).

In some embodiments, GPS coordinates of a location to be monitored may be stored in memory with a third-party. The location data may be communicated to the transmitter component 240, and the transmitter component 240 may communicate the location data to the remote computing device 160, the server 140, and/or other device or system.

The receiver component 220 may receive information such as packets, user data, and/or control information associated with various information channels (e.g., control channels, data channels, etc.). The receiver component 220 may be configured to receive data, audio and/or video streams from the remote computing device 160, which may be operated by a third party. Received data, audio and/or video streams may be passed onto object logistics determination component 230. In addition, the object logistics determination component 230 may detect data, audio, video, identification, movement, force, temperature, humidity, pressure, location, time, authentication, and/or encryption information at the apparatus 210 and may communicate the detected data to the transmitter component 240, and/or to other components of the apparatus 210 not specifically illustrated in FIG. 2.

Where the apparatus 210 is or includes any of a sensor unit, a control panel, or a local computing device, the receiver component 220 may be operable to receive data streams, including audio and/or video broadcasts from the remote computing device. Such audio and/or video broadcasts may be in the form of real-time verbal and/or graphic (e.g., video or still image) communications or a transmission of a pre-recorded communication. In some embodiments, the pre-recorded communication may be created by the manufacturer (i.e., messages that are pre-programmed by the original equipment manufacturer) or may be user-provided. Data streams may include data related to the location of the object, movement associated with the object, velocity or velocity changes, ambient temperature, object temperature, barometric pressures, other pressures and forces exerted on the object, humidity, liquid saturation measurements, or other suitable data streams.

The transmitter component 240 may then communicate the data to the remote computing device 160, the control panel 130, and/or the server 140. In some embodiments, a user may personally record a message to broadcast when certain conditions are met. In some embodiments, the audio and/or visual communication may be transmitted to a remotely located display device and/or speaker unit.

As discussed briefly before, a person or a company may have a desire or a need to track and verify the location of an object over a specific timeframe, over multiple timeframes, and/or at one or more locations over a specific or multiple timeframes. It may be useful to accurately and securely verify the presence of the object at a location at a specific time. In at least one example, the object may be a single item or a shipment of goods being sent from one location (e.g., a manufacturing location) to another location (e.g., the distribution company's location). In another example, it may be useful and desirable to track and verify that the object being shipped is in fact the original and/or intended object. In other words, that the object or shipment has not been contaminated with counterfeit goods or unauthorized replacement goods, or that the full shipment has been sent and portions of the shipment have not been lost in transit. In another example, it may be useful and desirable to determine that additional items have not been added to a shipment without authorization, such as might occur in a smuggling operation. In another example, the specific physical handling of the object or the shipment may be desirable to track and verify. Other potential examples are contemplated.

In at least one example scenario, the person or company may want to track and verify the movements of the object over the course of a shipment time (e.g., two weeks from location A to B). Thus, the person or an administrator of the company may download an object logistics tracking software application (e.g., an app, hereinafter "tracking app") to his or her computing device (such as a smartphone, a desktop computer, a laptop computer, a tablet, etc.). The tracking app may be, may include, or may be included in the object logistics determination component 230.

With regard to the object being tracked, an owner or an administrator of the object or shipment or some other entity may affix a tracking device to the object. The tracking device may use, for example, ZigBee Technology to determine location information. Other location information may be determined using Bluetooth Low Energy communications, Near-Field communications, RFID technology, and other proximity-based and communication techniques. In addition, the tracking device may include or may be associated with other sensors and tracking devices, such as sensors 110, which may include a gyroscope, an accelerometer, a microphone, a gas detector, a pressure sensor, a proximity sensor, an inclinometer, a photodetector, a thermometer, a barometer, a humidity sensor, or other suitable sensor.

In at least one embodiment, the object logistics determination component 230 may be or include a software component as part of a software application (e.g., the tracking app) installed on a computing device (e.g., the local computing device 150). The object logistics determination component 230 may thus execute in the background, gathering data from a computing device itself, from the sensor units 110, and/or from other devices (e.g., the remote computing device 160, the server 140, the network 120, the control panel 130, and/or other devices).

The object logistics determination component 230 may generally operate to securely and privately determine and preserve the location history of an object, as well as handling details. In some embodiments, determining and preserving the location history of the object is achieved to construct a continuous, accurate, and verifiable accounting of the transition of the object from a first location to a second location, and optionally to construct a continuous, accurate, and verifiable accounting of the inventory of a shipment associated with the object and handling of the object. The object logistics determination component 230 may include one or more of a location component 250, a handling component 260, an authentication component 270, and/or an encryption component 280.

In some embodiments, the object logistics determination component 230 may automatically and/or continually collect location history of the object with little or no input from human parties. In some embodiments, the object logistics determination component 230 may automatically collect location history of the object, but only when the user is determined to be located at a specific location; for example, if the object crosses into or out of an established geofence, or if the object is determined to be at a specific GPS location. In some embodiments, a geofence may be a virtual geographic boundary defined by, for example, GPS or RFID technology that enables software to trigger a response when an electronic device enters or leaves a particular area.

Data obtained automatically and/or manually by the object logistics determination component 230 to be used in creating a verifiable accounting of an object's whereabouts and handling at a specific time may include GPS data, WiFi hotspot data, GSM data, WAN Data, LAN Data, short range wireless data (e.g., BLUETOOTH®, NFC), timestamps, photo metadata, the presence of other objects and people, eyewitness accounts, security camera footage, RFID data, and/or other location data, data related to velocity, angle, pressure, light, moisture, weight, etc.

In one embodiment, the location component 250 may detect the presence of an object at a specific location. As mentioned previously, the object may be affixed with a tracking device. The tracking device may communicate with sensors and/or tracking devices associated with other objects to determine or confirm a location at a specific time. The location may be a geographical location such as a longitude, latitude, and/or altitude, may be at or include the entrance or exit of a building or a room within a building (e.g., a residential building, commercial building, government building, or other building); curtilage; a public space, such as a park or street; within a location of a geofence, or other location. In one embodiment, the location component 250 may detect the presence of the object at a location independent of anything or anyone other than the object itself. In an additional or alternative embodiment, the location component 250 may detect the presence of the object at a location relative to the location of other objects, including objects in the same shipment, or where other objects include a specific carrier, such as a specific ship, van, train, airplane, etc. In an additional or alternative embodiment, the tracking device may "check-in" at specific waypoints along the journey and/or may "check-in" with other objects within a pre-determined proximity of one another.

In some embodiments, the location component 250 may time stamp each time an identified object is located in a specific location, including time stamping an entrance into or onto a building, room, transportation vessel, or time stamping an exit out of a building, room, and/or transportation vessel. In an additional or alternative embodiment, the location component 250 may time stamp each time the object is determined to be within a pre-determined proximity of another tracking device or a checkpoint, including another object.

The handling component 260 may determine how the object is handled over time, which may include a change in orientation of the object, a pressure exerted on the object (including being dropped or being set underneath other objects), a moisture level of and/or around the object, a temperature level of and/or around the object, a change in weight of the object, whether a change in weight likely indicates a swap of objects, removal of one or more parts of an object or a shipment, additions to an object or a shipment, etc.

In at least one embodiment, the handling component 260 may determine how the object is handled over time by obtaining data from sensors affixed to or associated with the object such as a gyroscope, an accelerometer, a microphone, a gas detector, a pressure sensor, a proximity sensor, an inclinometer, a photodetector, a thermometer, a barometer, a humidity sensor, or other suitable sensor.

The authentication component 270 may determine that the object indicated as being at a location at a specific time, is in fact the object being tracked, that the object contains expected items (either in type or in quantity), and/or that the object is one of a group of objects of a shipment. In one embodiment, authentication is accomplished by cross-referencing two or more pieces of obtained data, such as GPS data obtained during a first time frame and a weight of the object versus GPS data obtained during a second, later time frame and the weight of the object. Other authentication may be accomplished by obtaining communications between objects within a pre-determined proximity of one another over one or multiple time frames. In this embodiment, the objects may communicate with one another by way of each object's respective tracking device communication in a mesh network, such as a P2P, ZigBee, or other short range communication network. Other authentication may be accomplished by taking automatic, continual or intermittent, photographs and videos with cameras, and automated acquisition of wireless data (LAN, Bluetooth, RFID, P2P, etc.). In alternative or additional embodiments, movement patterns established by GPS, or by accelerometers and gyroscopes affixed to the object may be enabled to determine whether unnatural or unexpected movements are being made that may indicate tampering with the object.

In at least one embodiment, the authentication component 270 may use multi-factor authentication; for example, the location of the object may be determined, such as through verified GPS coordinate matching, and confirmed by obtaining weather data of the determined location during a specific time frame with moisture and pressure data obtained from the object during the same time frame. In an additional or alternative embodiment, data may be entered manually by a person to indicate the presence of an object, which may be verified using obtained camera data showing the object at the indicated location. In an additional or alternative embodiment, the obtained location of the object may be authenticated by comparing the obtained location of an object in proximity in combination with another factor associated with both objects, such as obtained movement data over a time frame, moisture and light exposure, etc. In other words, two objects assumed to be in the same locations over the same time frames, are likely to experience similar physical manipulations based on weather, movement of the transportation vessel, etc.

In one embodiment, the authentication component 270 may therefore authenticate and confirm the location and handling of an object by communicating with third party sources such as security cameras, weather stations, news sources, or other suitable third party sources.

To have value related to the tracking of the object, it may be important that the data associated with location and handling determinations (whether it be raw data or analyzed data) are true and accurate. In some cases, GPS spoofing and/or falsification of GPS data may be a common problem, rendering any accounting untrustworthy. Thus, in at least one embodiment, to provide a true and accurate accounting, the authentication component 270 may employ one or more forms of defense to counteract manipulation of the data. In one example, if data is determined to be manipulated, the administrator may be notified. In an additional or alternative embodiment, the authentication component 270 may also ensure that the data used to compile the accounting has not been tampered with or otherwise falsified (i.e., locations, times, authentication data).

In some embodiments, the encryption component 280 may ensure that location data and handling data is stored and communicated in a secure manner. In some embodiments, the encryption component 280 ensures that the data obtained, processed, and communicated is done so while maintaining an expected level of privacy and security for the object, the shipment, the shippers, the receivers, owners, administrators, etc. Although an encryption component 280 is provided, encryption may be an optional action taken with regards to obtaining, linking, and/or authenticating the location and handling data. Thus, in some embodiments, the data may be subject to encryption. Encryption methods may include checksums, cyclic redundancy checks (CRC), public key encryption (e.g., secure sockets layer (SSL), transport layer security (TLS)), hashing algorithms, advanced encryption standard (AES), block chain algorithms, or other suitable encryption.

In one example, block chaining may be implemented to encrypt the data and/or protect it against manipulation or alteration. Block chaining may include or involve a continuously growing list of records or "blocks" linked together and secured using a manner of cryptography such as a hashing algorithm. Each new block at the end of the chain may contain a cryptographic hash of the previous block, as well as a time stamp and transactional data. In some embodiments, the new block may be considered the "head record." For example, as data related to the object is obtained over time, each new datum of the object's location and/or handling at a specific time and a hash of the previous block may become the latest or newest "block" to the block chain. After each new block is recorded, the data in any given block cannot be altered retroactively without altering all of the subsequent blocks.

When a party wishes to provide an accounting of the location and handling of an object, he or she can provide the hashing algorithm and/or cryptography key to unravel the block chain from the newest block to the original block. If the block chain is able to be unraveled from one block to the next, the data has not been modified. If the block chain is not able to be unraveled from one block to the next, the data has likely been modified and the original data cannot be accessed. In some embodiments, the block chain may be associated with data from multiple devices (e.g., multiple cell phones, multiple computers, etc.), whereas in other embodiments, the block chain may be tied to a particular device (e.g., the object's tracking device, an administrator's computing device, etc.)

Data obtained by and/or sent to any of the devices described herein, including the sensor units 110, the control panel 130, the local computing device 150, the remote computing device 160, and/or the server 140 may be securely transferred using any encryption and security techniques contemplated, not necessarily through block chaining methods.

In one example, the software application described herein may be prevented from executing on a rooted or jailbroken device. In another example, location and handling data may be stored (e.g., on a local computing device, on a remote computing device, on a remote server, in the "cloud", or in another location) using a public and/or a private cryptographic key. In the example where the data is stored using a private cryptographic key, an administrator associated with the object for which the location and handling data is being obtained may keep possession of a private key so that none of the data obtained and stored can be decrypted without possession of the private key. When an accounting is needed, the administrator may provide the private key to, e.g., a third party. The third party may then download or obtain the complete set of data/accounting with belief that the data has not been manipulated. In some embodiments, the third party cannot read the data without the private key, and the administrator cannot utilize all the data without voluntarily providing the key to the third party.

Figure 3:
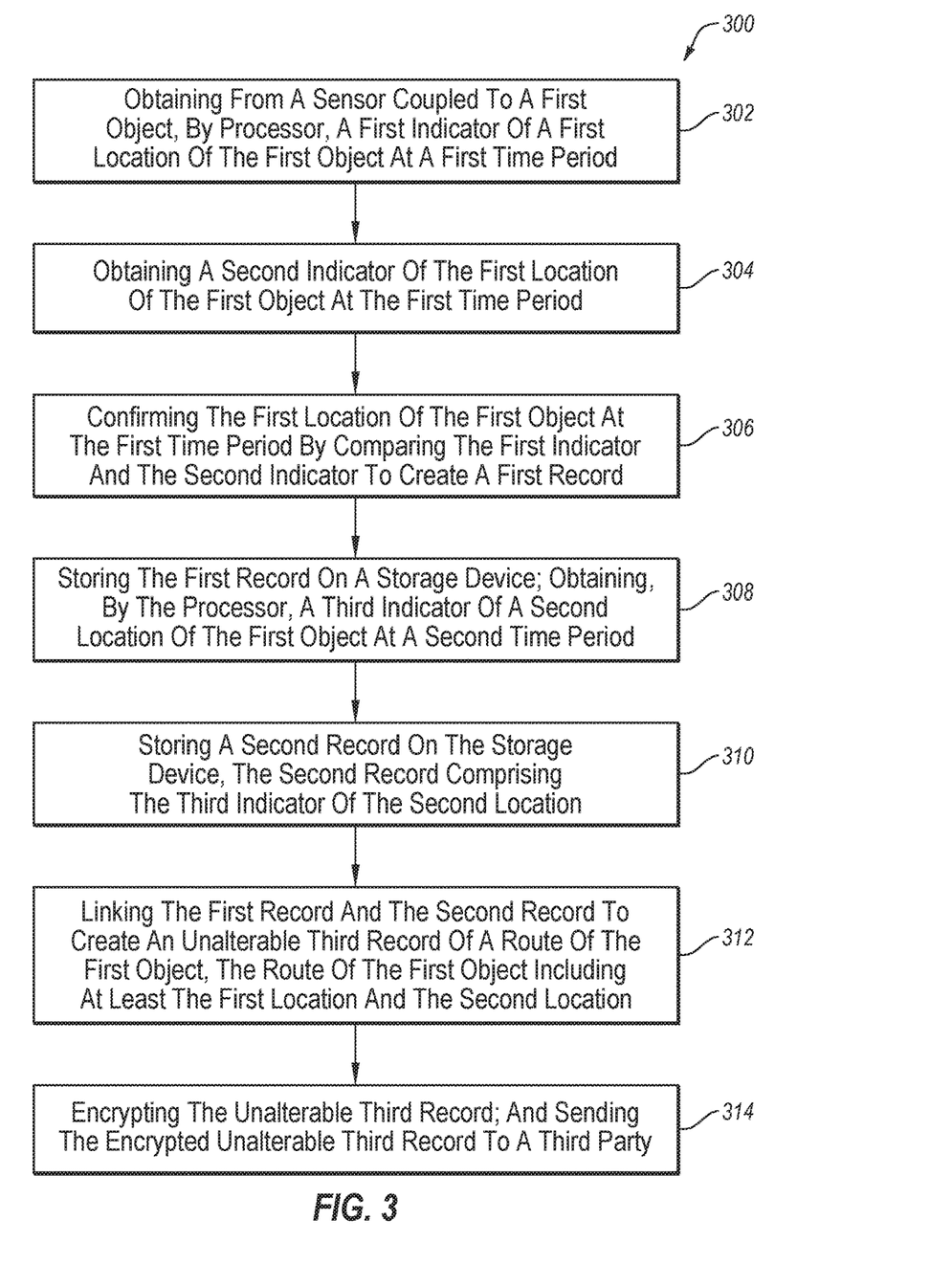
FIG. 3 illustrates a flowchart of an example method of time and location-based object tracking and presence confirmation in accordance with at least one embodiment.

FIG. 3 illustrates a flowchart of an example method 300 of time and location-based object tracking and presence confirmation in accordance with at least one embodiment. The method 300 may be performed by any suitable system, apparatus, or device. Although illustrated with discrete blocks, the steps and operations associated with one or more of the blocks of the method 300 may be divided into additional blocks, combined into fewer blocks, or eliminated, depending on the particular implementation.

At block 302, the method may include obtaining from a sensor coupled to a first object, by a processor, a first indicator of a first location of the first object at a first time period. In one embodiment, block 302 may be performed by a location component, such as the location component 250 described with reference to FIG. 2.

At block 304, the method 300 may include obtaining a second indicator of the first location of the first object at the first time period. In one embodiment, block 304 may be performed by a location component, such as the location component 250 described with reference to FIG. 2.

At block 306, the method 300 may include confirming the first location of the first object at the first time period by comparing the first indicator and the second indicator to create a first record. In one embodiment, block 306 may be performed by an authentication component, such as the authentication component 270 described with reference to FIG. 2.

At block 308, the method 300 may include storing the first record on a storage device. In one embodiment block 308 may be performed by or on a computing device coupled to memory, such as local computing device 150, remote computing device 160, and/or server 140.

At block 310, the method 300 may include obtaining, by the processor, a third indicator of a second location of the first object at a second time period. In one embodiment, block 310 may be performed by a location component, such as the location component 250 described with reference to FIG. 2.

At block 312, the method 300 may include storing a second record on the storage device, the second record comprising the third indicator of the second location. In one embodiment block 312 may be performed by or on a computing device coupled to memory, such as local computing device 150, remote computing device 160, and/or server 140.

At block 314, the method 300 may include linking the first record and the second record to create an unalterable third record of a route of the first object, the route of the first object including at least the first location and the second location. In one embodiment, block 314 may be performed by an encryption component, such as the encryption component 280 described with reference to FIG. 2.

At block 316, the method 300 may include encrypting the unalterable third record. In one embodiment, block 316 may be performed by an encryption component, such as the encryption component 280 described with reference to FIG. 2.

At block 318, the method 300 may include sending the encrypted unalterable third record to a third party. In one embodiment, block 318 may be performed by a transmitter component, such as the transmitter component 240 described with reference to FIG. 2.

The method 300 may improve the efficiency and efficacy of time and location-based object tracking and presence confirmation; for example, determining the presence of and authenticating the location of an object at a location over a number of iterations may help to identify the route more quickly and with more accuracy than with obtaining a single datum at a single time and location. In such a case where the route is not following an expected path, remedial actions may be taken to get the object back on track. In an additional or alternative embodiment, if there is unexpected handling of the package in route, remedial actions may be taken earlier than waiting for the final delivery of the package, including involving law enforcement, customs officials, inspecting the object en route, etc.

In an alternative or additional embodiment, the accuracy of determining the route of an object and handling of the object may be improved by using computer learning algorithms and/or artificial intelligence techniques. In some embodiments, a computer learning algorithm may be applied to the comparison of two indicators of location at a specific time. An accuracy or confidence score may be determined based on the comparison, and the indicator of presence at a specific location at a specific time may be assigned an accuracy score. With each iteration of collecting the location and handling of an object using at least one or more data points, the computer learning algorithm may increasingly improve the accuracy and reliability of each successive collection of data.

Modifications, additions, or omissions may be made to the method 300 without departing from the scope of the present disclosure. For example, the operations of the method 300 may be implemented in a different order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 4:
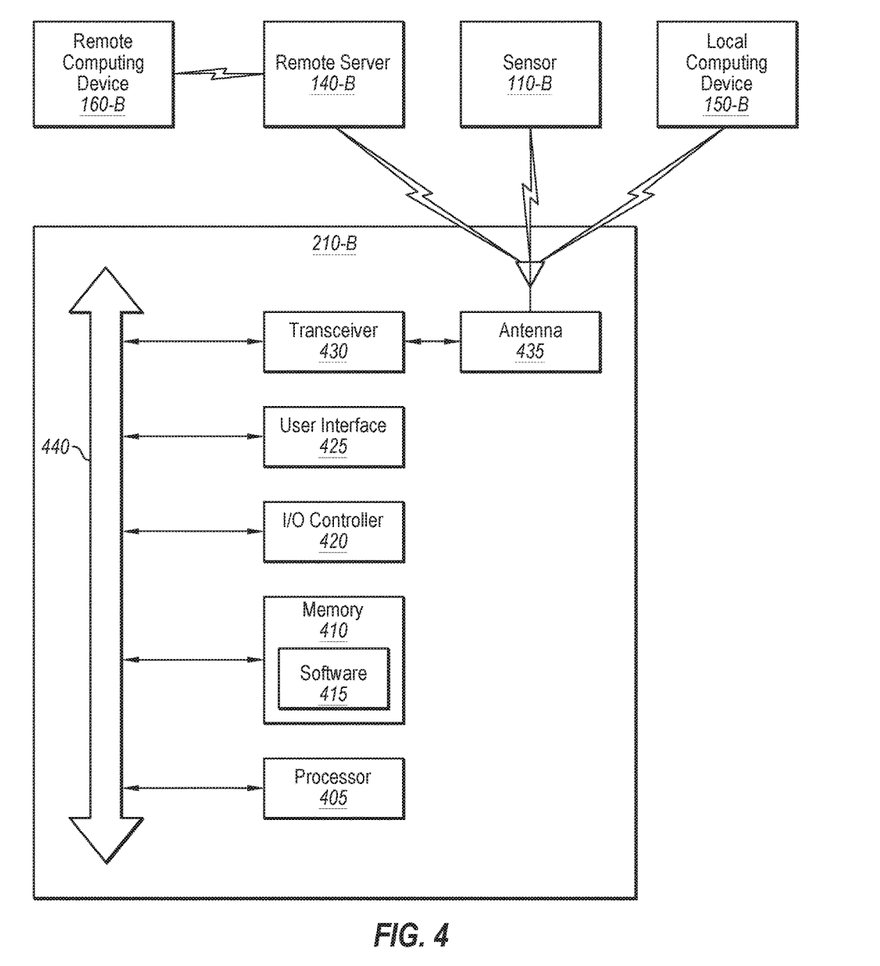
FIG. 4 illustrates a system for use in time and location-based object tracking and presence confirmation in accordance with at least one embodiment.

FIG. 4 illustrates a system 400 for use in time and location-based object tracking and presence confirmation in accordance with at least one embodiment. The system may include an apparatus 210-B, which may be an example of one or more aspects of any of the sensor unit 110, the control panel 130, the server 140, the local computing device 150, and/or the remote computing device 160 described with reference to FIG. 1. The apparatus 210-B may also be an example of one or more aspects of the apparatus 210 described with reference to FIG. 2.

The apparatus 210-B may include components for bi-directional voice and data communications including components for transmitting communications and components for receiving communications. For example, the apparatus 210-B may communicate bi-directionally with one or more of a local computing device 150-B, one or more sensor units 110-B, a remote computing device 160-B, and/or a remote server 140-B, which may include or correspond to the similarly named and numbered components described with reference to FIGS. 1 and 2. This bi-directional communication may be direct (e.g., the apparatus 210-B communicating directly with the remote computing device 160-B) or indirect (e.g., the apparatus 210-B communicating indirectly with the remote computing device 160-B through the remote server 140-B or one or more other intervening components).

The apparatus 210-B may also include a processor 405, memory 410 (including software/firmware code (SW) 415), an input/output controller 420, a user interface 425, a transceiver 430, and one or more antennas 435 each of which may communicate-directly or indirectly—with one another (e.g., via one or more buses 440). The transceiver 430 may communicate bi-directionally-via the one or more antennas 435, wired links, and/or wireless links—with one or more networks or remote devices as described above. For example, the transceiver 430 may communicate bi-directionally with one or more of the sensor units 110-B, the local computing device 150-B, the remote computing device 160-B, and/or the remote server 140-B. The transceiver 430 may include a modem to modulate the packets and provide the modulated packets to the one or more antennas 435 for transmission, and to demodulate packets received from the one or more antennas 435. While the apparatus 210-B may include a single antenna 435, the apparatus 210-B may also have multiple antennas 435 capable of concurrently transmitting or receiving multiple wired and/or wireless transmissions. In some embodiments, one element of the apparatus 210-B (e.g., one or more antennas 435, transceiver 430, etc.) may provide a direct connection to the remote server 140-B via a direct network link to the Internet via a POP (point of presence). In some embodiments, one element of the apparatus 210-B (e.g., one or more antennas 435, transceiver 430, etc.) may provide a connection using wireless techniques, including digital cellular telephone connection, Cellular Digital Packet Data (CDPD) connection, digital satellite data connection, and/or another connection.

The signals associated with the system 400 may include wireless communication signals such as radio frequency, electromagnetics, LAN, WAN, virtual private network (VPN), mesh networking (such as peer-to-peer (P2P)), wireless network (using 802.11, for example), 345 MHz, Z-WAVE®, cellular network (using 3G and/or LTE, for example), and/or other signals. The one or more antennas 435 and/or transceiver 430 may include and/or may be related to WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB), or other antennas or standards. In some embodiments, each antenna 435 may receive signals or information specific and/or exclusive to itself. In some embodiments, each antenna 435 may receive signals or information not specific or exclusive to itself.

In some embodiments, one or more sensor units 110-B may connect to some element of the system 400 via a network using one or more wired and/or wireless connections. In some embodiments, the user interface 425 may include an audio device, such as an external speaker system, an external display device such as a display screen, and/or an input device (e.g., a remote control device interfaced with the user interface 425 directly and/or through the input/output controller 420). One or more buses 440 may allow data communication between one or more elements of the apparatus 210-B (e.g., between one or more of the processor 405, the memory 410, the input/output controller 420, the user interface 425, and/or other elements of the apparatus 210-B).

The memory 410 may include RAM, ROM, flash RAM, and/or other types. The memory 410 may store computer-readable, computer-executable software/firmware code 415 including instructions that, when executed, cause the processor 405 to perform various functions described in this disclosure (e.g., time-based verification for determining the presence of users at specific locations). Alternatively, the software/firmware code 415 may not be directly executable by the processor 405 but may cause a computer (e.g., when compiled and executed) to perform functions described herein. Alternatively, the computer-readable, computer-executable software/firmware code 415 may not be directly executable by the processor 405 but may be configured to cause a computer (e.g., when compiled and executed) to perform functions described herein. The processor 405 may include an intelligent hardware device, e.g., a central processing unit (CPU), a microcontroller, an application-specific integrated circuit (ASIC), etc.

In some embodiments, the methods and/or operations described herein may be executed or run on different components of the system 400 and/or any of the computing devices described with reference to FIGS. 1, 2, and/or 3. For example, in some embodiments, location and/or identification data may be obtained by the local computing device 150 (of FIG. 1), and processing with regard to the obtained data may be performed by the processor of the local computing device 150. The encrypted data, however, may be sent to and stored at a remote server (e.g., "the cloud," the remote server 140, the remote server 140-B, and/or other remote server or location). In some embodiments, location and/or identification data may be collected by the local computing device 150, 150-B, but may be sent to a remote computing device (e.g., 160, 160-B) for storage and/or processing. In some embodiments, encryption methods to secure the data and prevent malicious manipulation may be enabled on the local computing device 150, 150-B, with the encrypted output being stored on the remote server 140, 140-B, and/or the remote computing device 160, 160-B.

In some embodiments, the memory 410 may contain, among other things, a Basic Input-Output system (BIOS) which may control basic hardware and/or software operations such as the interaction with peripheral components or devices. Applications resident with system 400 are generally stored on and accessed via a non-transitory computer-readable medium, such as a hard disk drive or other storage medium. Additionally, applications may be in the form of electronic signals modulated in accordance with the application and data communication technology when accessed via a network interface (e.g., the transceiver 430, the one or more antennas 435, etc.).

Many other devices and/or subsystems may be connected to one or more elements of the system 400, or may be included as one or more elements of the system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements illustrated in FIG. 4 need not be present to practice the present systems and methods. The devices and subsystems may be interconnected in different ways from that illustrated in FIG. 4. In some embodiments, an aspect of some operation of a system, such as that illustrated in FIG. 4, may be readily known in the art and are not discussed in detail in this application. Code to implement the present disclosure may be stored in a non-transitory computer-readable medium such as one or more of the system memory 410 or other memory. The operating system provided on the input/output controller 420 may be or include iOS®, ANDROID®, MS-DOS®, MS-WINDOWS®, OS/2®, UNIX®, LINUX®, or another known operating system, or a proprietary operating system.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. As an aid to understanding, the following appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
   obtaining from a sensor coupled to a first object, by a processor, a first indicator of a first location of the first object at a first time period;
   obtaining a second indicator of the first location of the first object at the first time period;
   confirming the first location of the first object at the first time period by comparing the first indicator and the second indicator to create a first record;
   storing the first record on a storage device;
   obtaining, by the processor, a third indicator of a second location of the first object at a second time period;
   storing a second record on the storage device, the second record comprising the third indicator of the second location;
   linking the first record and the second record to create an unalterable third record of a route of the first object, the route of the first object including at least the first location and the second location;
   encrypting the unalterable third record; and
   sending the encrypted unalterable third record to a third party.

2. The method of claim 1, further comprising obtaining, by the processor, data related to physical manipulation of the first object.

3. The method of claim 2, wherein obtaining data related to physical manipulation of the first object comprises receiving an indicator of manipulation from the sensor coupled to the first object, the indicator of manipulation at least one of a change in temperature, moisture level, pressure, force, velocity, mass, route, tilt, vibration, rotation, or a combination thereof.

4. The method of claim 1, wherein obtaining the second indicator of the first location comprises obtaining data from a second sensor coupled to a second object, the second object located within a predetermined distance of the first object, and wherein the sensor coupled to the first object is in communication with the second sensor.

5. The method of claim 4, wherein obtaining data from the second sensor coupled to the second object comprises obtaining data from the second sensor coupled to the second object where the second object has a static location.

6. The method of claim 1, wherein obtaining the first, second, and third indicator comprises obtaining at least one of photographic data, video data, sound data, text data, wireless data, alphanumeric data, physical manipulation data, or a combination thereof.

7. The method of claim 1 wherein obtaining the second indicator comprises obtaining the second indicator by a second method different from a first method to obtain the first indicator.

8. The method of claim 1, further comprising:
applying a computer learning algorithm to the comparison of the first indicator and the second indicator;
determining an accuracy score of the first record based in part on applying the computer learning algorithm; and
updating the first record based in part on the accuracy score.

9. The method of claim 1, wherein linking the first record and the second record comprises linking using block chain encryption.

10. The method of claim 1, wherein obtaining the first indicator of the first location comprises obtaining, by the processor, the first indicator automatically obtained without input from a human.

11. The method of claim 1, further comprising:
determining an attempt to falsify the first record; and
transmitting an alert to the third party based on determining the attempt to falsify the first record.

12. The method of claim 1, further comprising storing the first record in memory associated with the processor.

13. The method of claim 1, further comprising sending the encrypted unalterable third record to a third party storage device.

14. The method of claim 1, wherein obtaining from the sensor coupled to the first object, a first indicator of a first location comprises obtaining data from a tracking device coupled to the first object, wherein the tracking device communicates with a second computer device by way of mesh networking communications.

15. A system, comprising:
a processor,
a memory in electronic communication with the processor; and
instructions stored in the memory, the instructions being executable by the processor to cause the system to perform operations comprising:
obtaining from a sensor coupled to a first object, by a processor, a first indicator of a first location of the first object at a first time period;
obtaining a second indicator of the first location of the first object at the first time period;
confirming the first location of the first object at the first time period by comparing the first indicator and the second indicator to create a first record;
storing the first record on a storage device;
obtaining, by the processor, a third indicator of a second location of the first object at a second time period;
storing a second record on the storage device, the second record comprising the third indicator of the second location;
linking the first record and the second record to create an unalterable third record of a route of the first object, the route of the first object including at least the first location and the second location;
encrypting the unalterable third record; and
sending the encrypted unalterable third record to a third party.

16. The system of claim 15, further comprising obtaining, by the processor, data related to physical manipulation of the first object.

17. The system of claim 16, wherein when the processor obtains data related to physical manipulation of the first object, the instructions are executable to perform operations comprising:
receiving an indicator of manipulation from the sensor coupled to the first object, the indicator of manipulation at least one of a change in temperature, moisture level, pressure, force, velocity, mass, route, tilt, vibration, rotation, or a combination thereof.

18. The system of claim 15, wherein when the processor obtains the second indicator of the first location, the instructions are executable to perform operations comprising:
obtaining data from a second sensor coupled to a second object, the second object located within a predetermined distance of the first object, and wherein the sensor coupled to the first object is in communication with the second sensor.

19. The system of claim 15, further comprising wherein linking the first record and the second record further comprises linking using block chain encryption.

20. One or more non-transitory computer-readable media comprising one or more computer-readable instructions that, when executed by one or more processors of a computing device cause the computing device to perform a method comprising the steps of:
obtaining from a sensor coupled to a first object, by a processor, a first indicator of a first location of the first object at a first time period;
obtaining a second indicator of the first location of the first object at the first time period;
confirming the first location of the first object at the first time period by comparing the first indicator and the second indicator to create a first record;
storing the first record on a storage device;
obtaining, by the processor, a third indicator of a second location of the first object at a second time period;
storing a second record on the storage device, the second record comprising the third indicator of the second location;
linking the first record and the second record to create an unalterable third record of a route of the first object, the route of the first object including at least the first location and the second location;
encrypting the unalterable third record; and
sending the encrypted unalterable third record to a third party.

* * * * *